Figure 1:
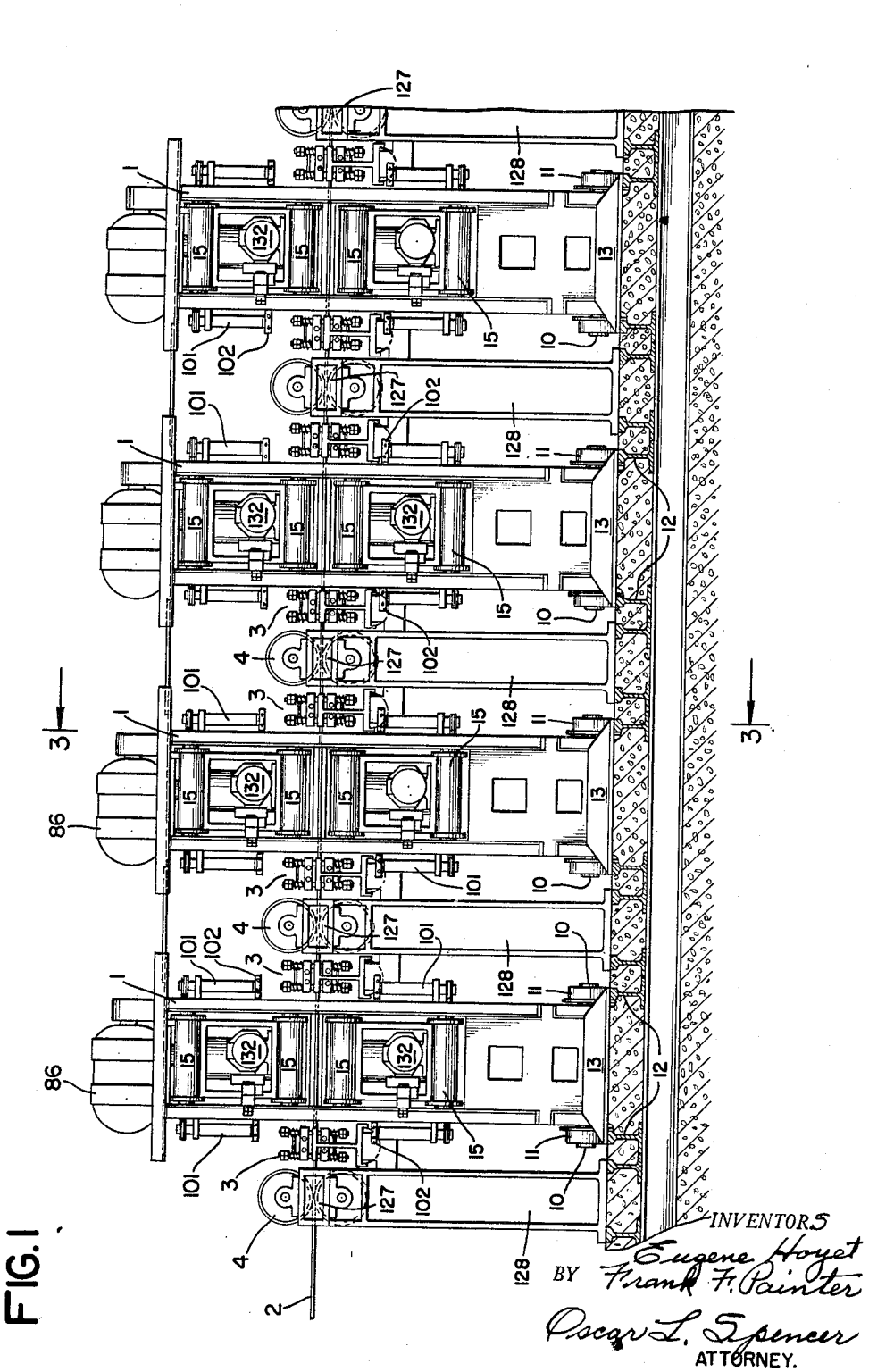

March 30, 1954  E. HOYET ET AL  2,673,423
METHOD AND APPARATUS FOR SURFACING GLASS
Filed March 14, 1951  11 Sheets-Sheet 1

INVENTORS
Eugene Hoyet
BY Frank F. Painter
Oscar L. Spencer
ATTORNEY.

INVENTORS
Eugene Hoyet
BY Frank H. Painter
Oscar L. Spencer
ATTORNEY.

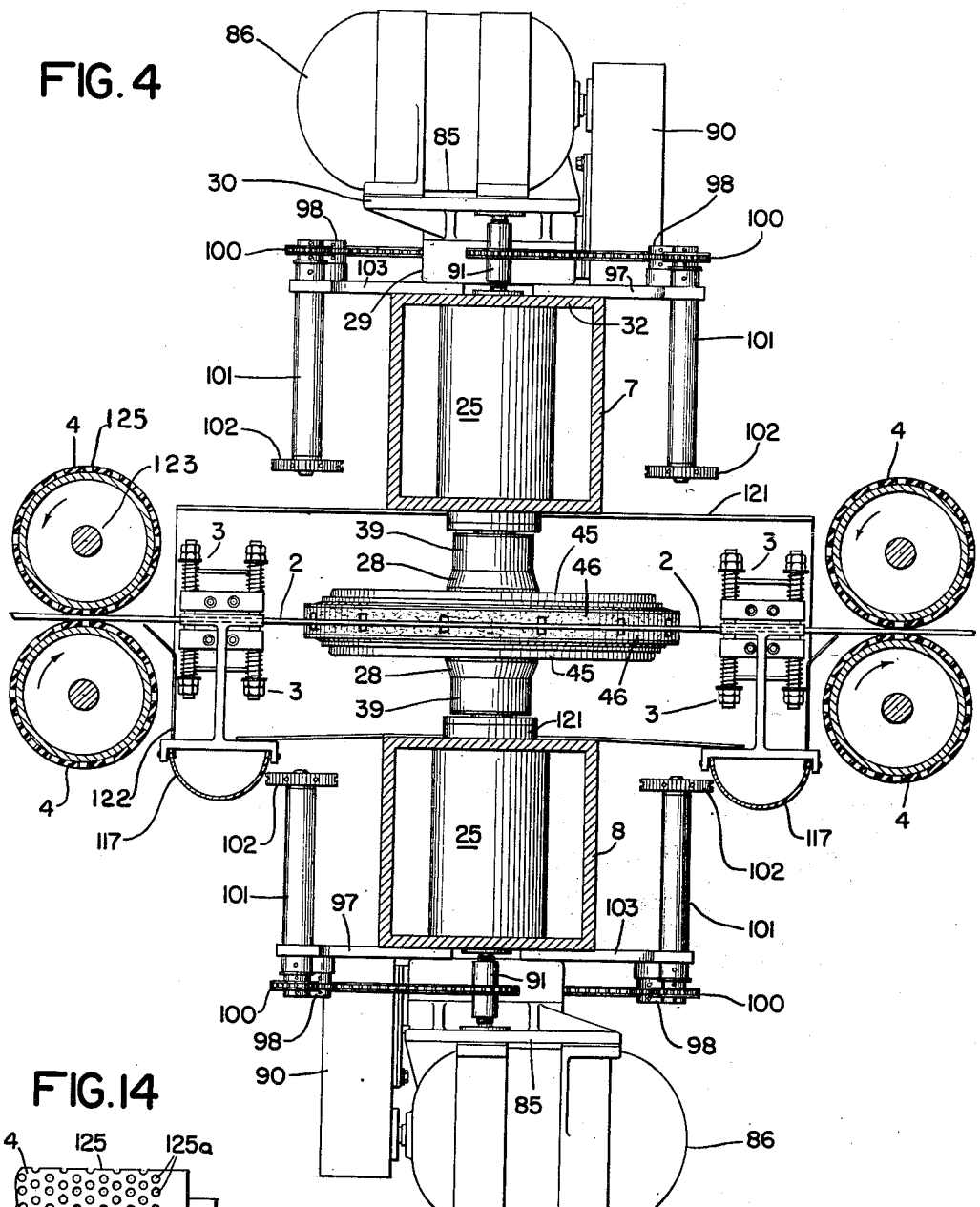
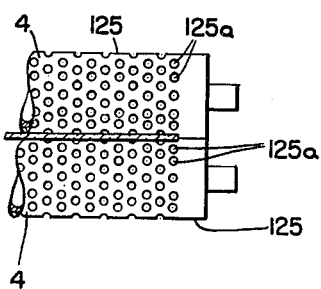

March 30, 1954 E. HOYET ET AL 2,673,423
METHOD AND APPARATUS FOR SURFACING GLASS
Filed March 14, 1951 11 Sheets-Sheet 5

INVENTORS
Eugene Hoyet
BY Frank F. Painter

Oscar L. Spencer
ATTORNEY.

March 30, 1954 E. HOYET ET AL 2,673,423
METHOD AND APPARATUS FOR SURFACING GLASS
Filed March 14, 1951 11 Sheets-Sheet 6

INVENTORS.
Eugene Hoyet
Frank F. Painter
BY
Oscar L. Spencer
ATTORNEY.

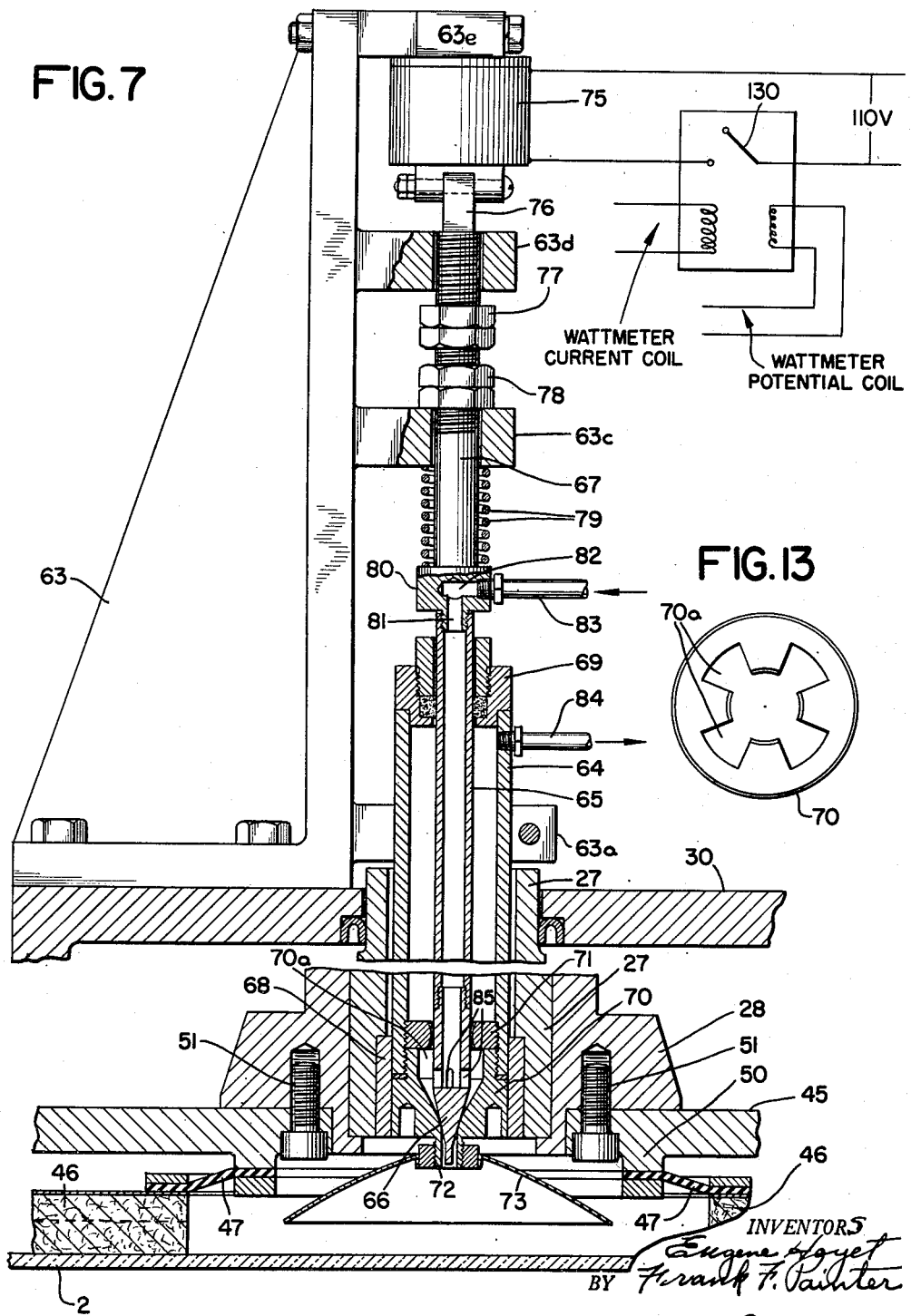

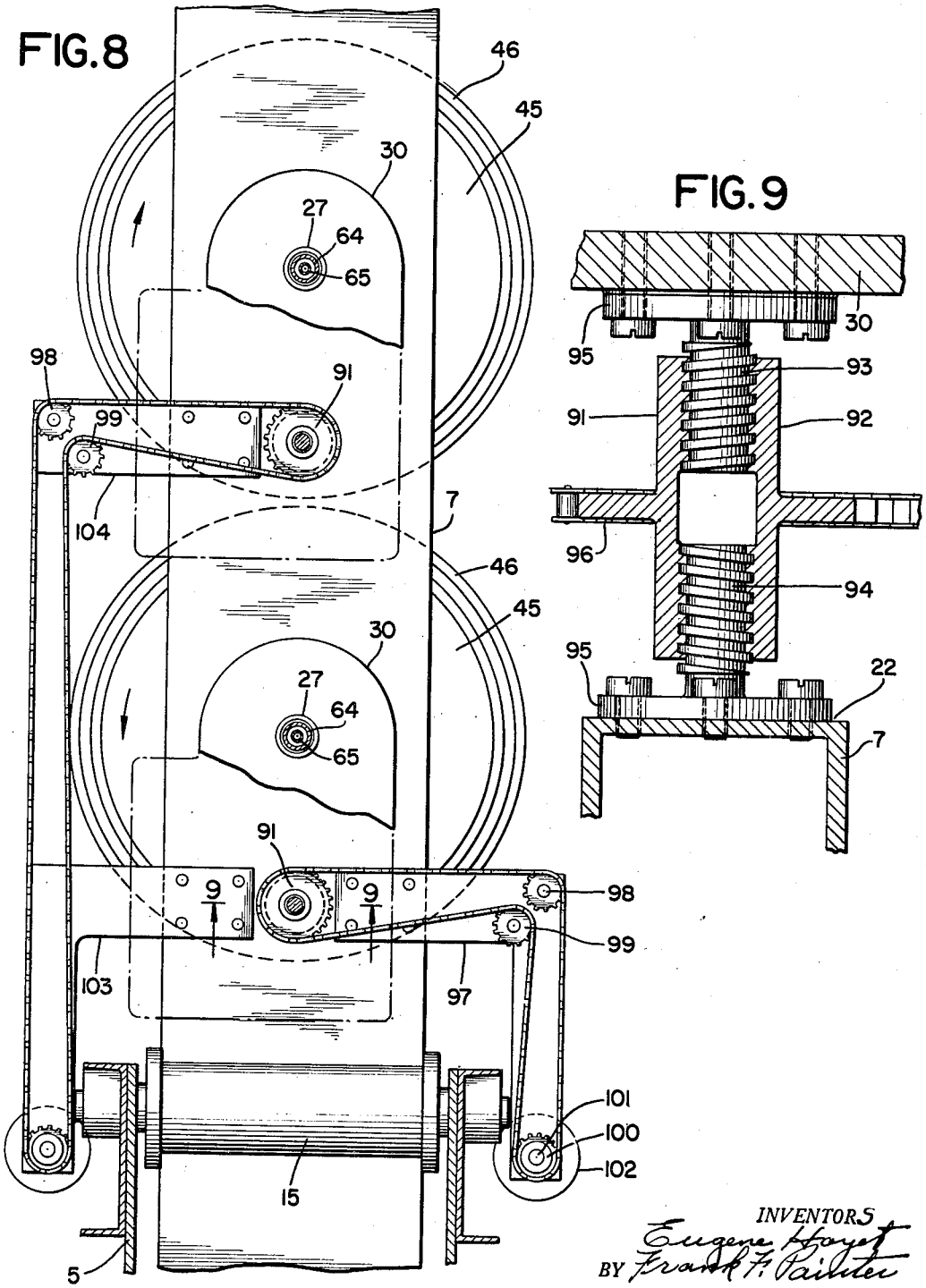

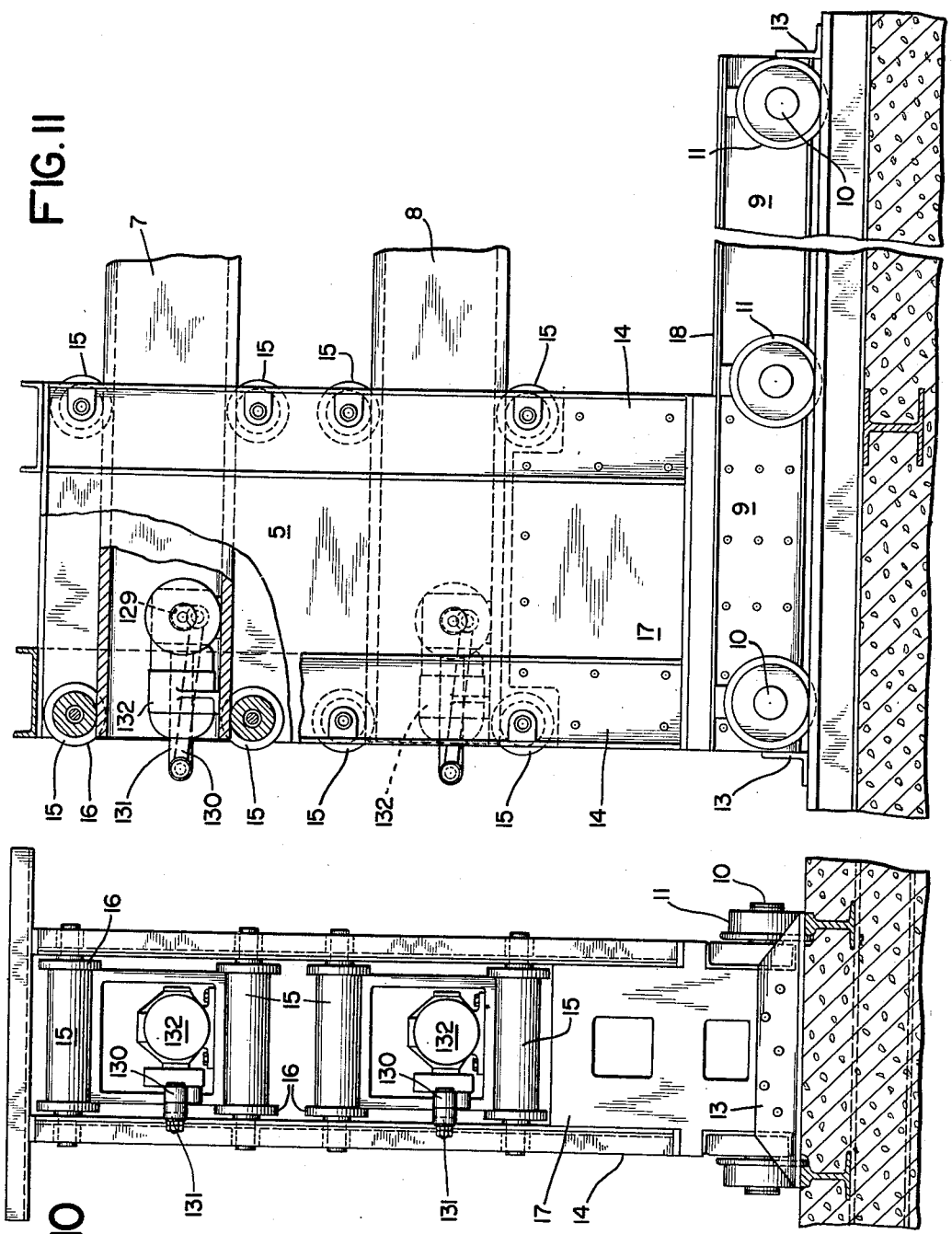

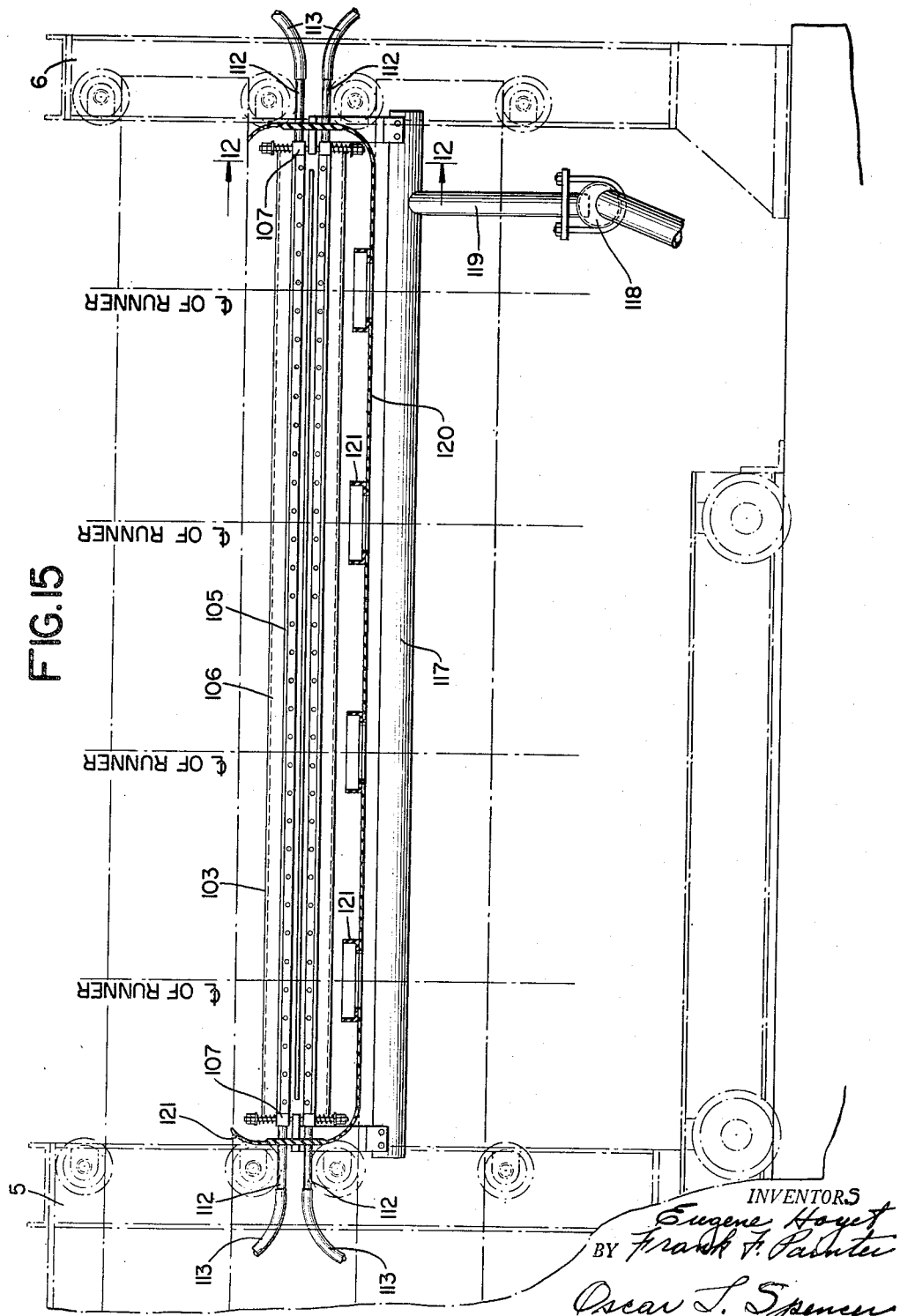

Patented Mar. 30, 1954

2,673,423

UNITED STATES PATENT OFFICE 2,673,423

METHOD AND APPARATUS FOR SURFACING GLASS

Eugene Hoyet and Frank F. Painter, Tarentum, Pa., assignors to Pittsburgh Plate Glass Company Application March 14, 1951, Serial No. 215,518

18 Claims. (Cl. 51—112)

This invention relates to apparatus for the simultaneous grinding and polishing of opposite sides of a continuous ribbon of glass passed through the apparatus in a horizontal position. The apparatus as illustrated is specifically adapted for polishing glass, but the same principles of operation of the apparatus are adaptable to all or some of the grinding operations performed on the glass preparatory to polishing.

The apparatus embodying the invention is primarily designed for operation on a continuous ribbon of glass, however, it is also equally adaptable to polishing a series of sheets passed through the apparatus in substantially abutting relation.

One of the principal obstacles to successful simultaneous polishing of opposite faces of a continuous ribbon of glass is the frequency with which the glass breaks, during the polishing operation, necessitating stopping of the apparatus and removal of the broken glass. Frequently, the broken glass so damages the runner polishing felts that these must also be replaced before polishing can be resumed.

Glass breakage results from two principal causes, unequal expansion and flexure. The frictional resistance between the rotating polishing runners and the glass creates heat which passes into the glass, causing expansion therein. Where, as in the present apparatus, a wide ribbon of glass is being polished and a plurality of polishing runners are disposed transversely of the glass, the probabilities of unequal heating between adjacent felts and consequential unequal expansion increases the possibilities of glass breakage. The unequal wearing of adjacent felts, both transversely and longitudinally of the glass ribbon, promotes sharp flexures which contribute to glass breakage. The magnitude of these problems can be more readily appreciated when the polishing apparatus handles glass greater than 100 inches wide at a speed in excess of 100 inches per minute.

In order to reduce the length of the polishing apparatus, it is also proposed to use greatly increased pressures of the polishing felts upon the glass ribbon to speed up the polishing action. The usual pressures used in apparatus for polishing but one side of a glass sheet, supported upon plaster beds mounted on continuous lines of wheeled cars passing beneath the felt runners, is 8 to 10 ounces of pressure per square inch. The present apparatus is adapted for use with 20 to 40 ounces or more of diaphragm pressure per square inch when the glass is supported in the manner hereinafter described.

One object of the invention is to float the glass in substantially a single horizontal plane, while moving between the rotating polishing felts of opposing spindles, by means of fluid pressure acting upon the felts independently of the mass of the opposing driving spindles.

Another object of the invention is to expose the glass to frequent suitable cooling mediums as it passes through the polishing apparatus so as to avoid a build-up of temperature within the glass, thereby eliminating a principal cause of glass breakage.

Another object of the invention is to control the temperature increase within the glass, between the individual pairs of opposing felts, through regulation of the feeding of rouge mixture to the felts.

Another object of the invention is to provide sufficient flexibility between the opposing polishing felts and the adjacent runners to effect substantially uniform heating of the glass, transversely thereof, by avoiding heat concentrations under any particular area of the individual felts.

A further object of the invention is to provide automatic compensation for wear of the opposing felts on opposite sides of the glass.

Figure 2:
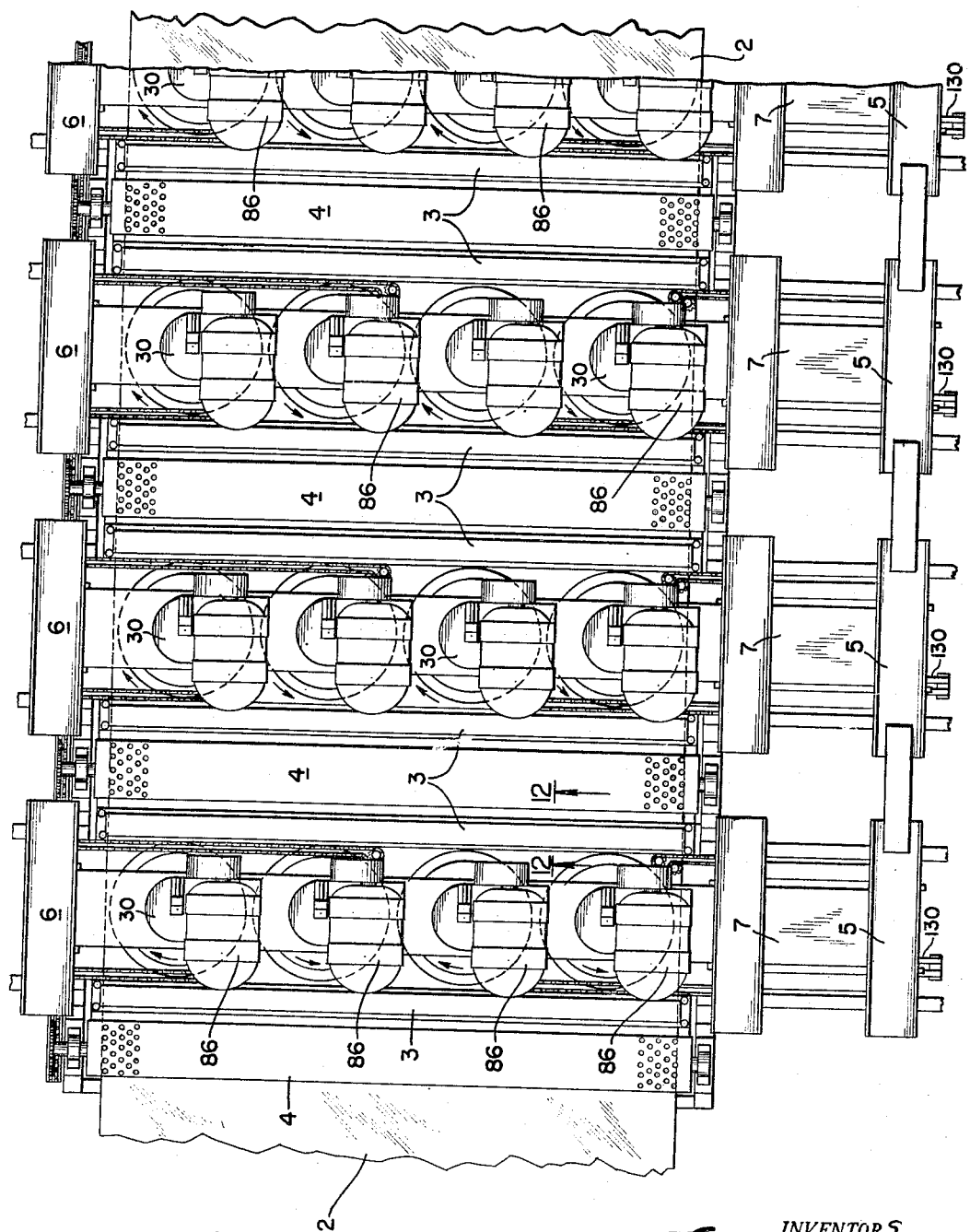
Figure 3:
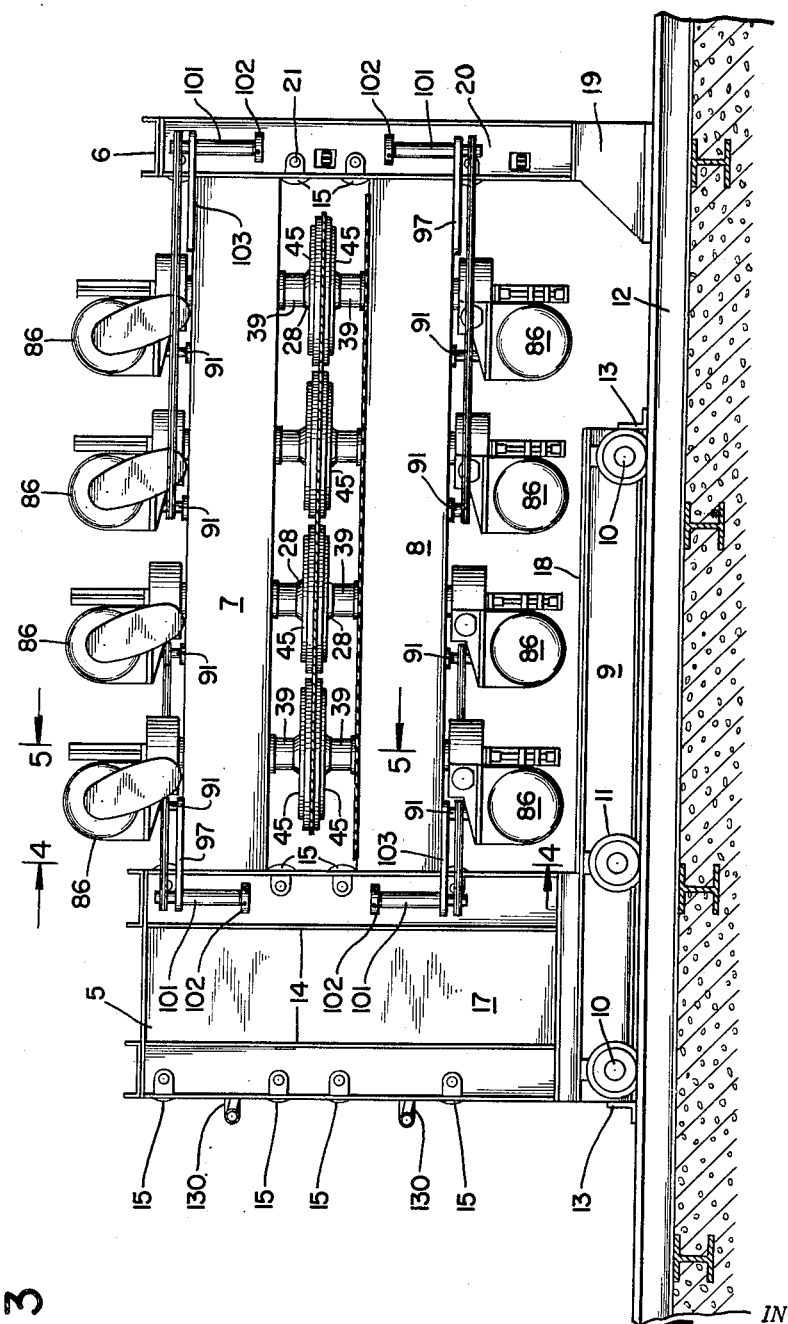
Figure 5:
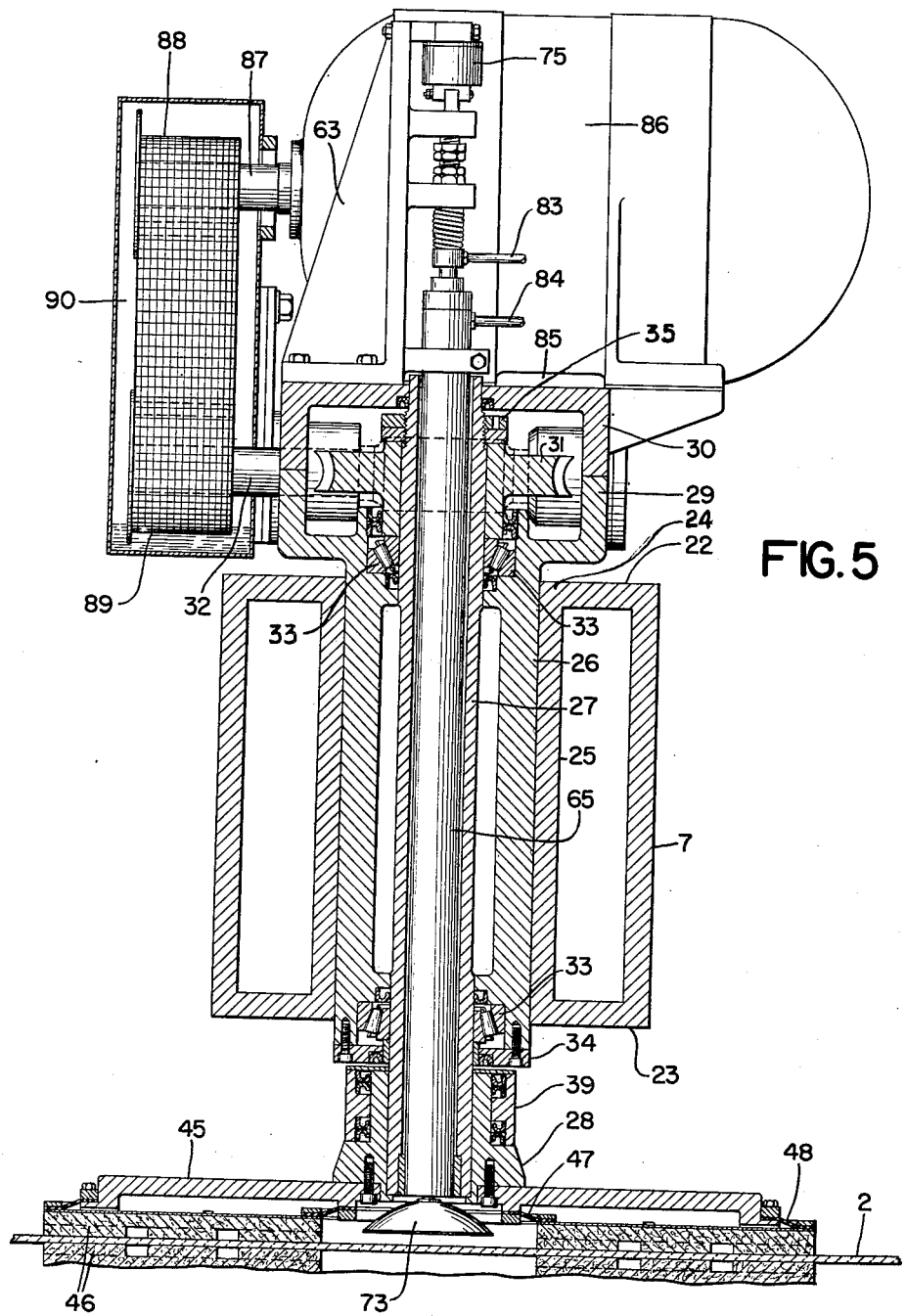
Figure 6:
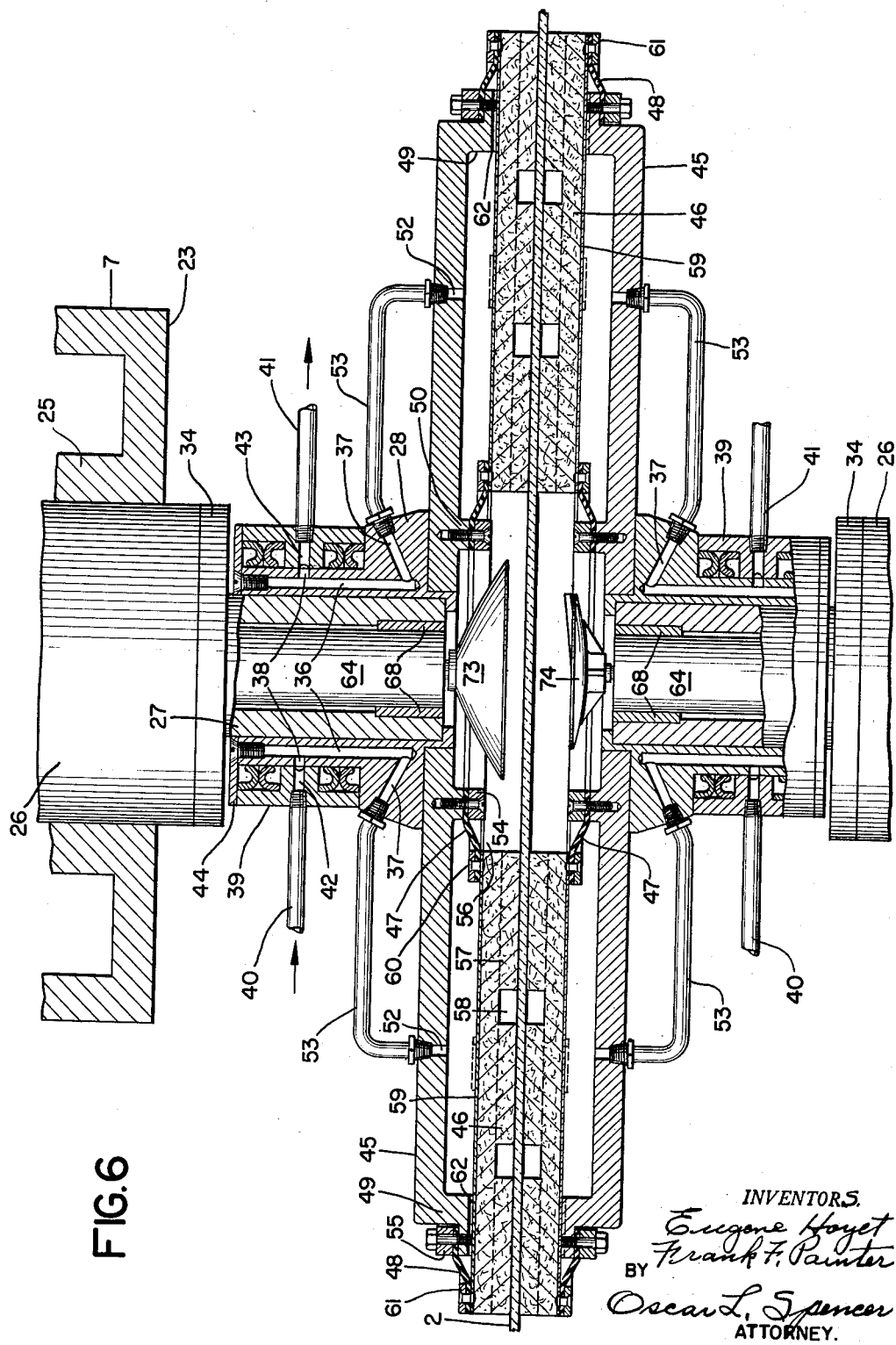
Figure 12:
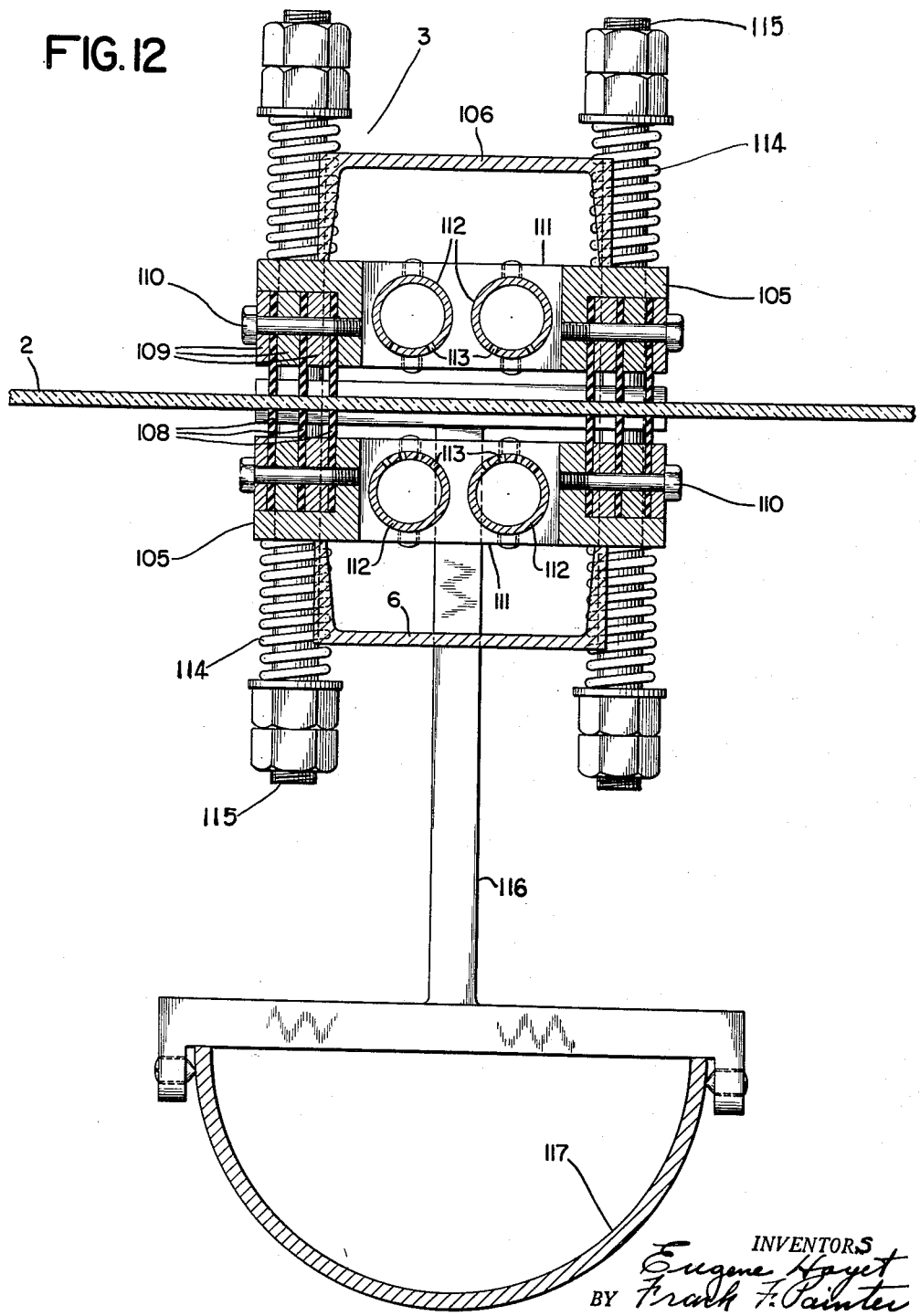

In the drawings forming part of this specification, Fig. 1 shows a longitudinal elevation view of the apparatus; Fig. 2 shows a plan view of the apparatus of Fig. 1; Fig. 3 shows a transverse section taken along lines 3—3 of Fig. 1; Fig. 4 shows an enlarged section through one of the polishing bridges taken at lines 4—4 of Fig. 3; Fig. 5 shows in enlarged detail the spindle assembly taken at lines 5—5 of Fig. 3; Fig. 6 shows an enlarged detail section through the polishing runners; Fig. 7 shows in enlarged detail a cross-section of the rouge feed valve assembly; Fig. 8 shows in enlarged detail a partial plan view of the manual adjustment for the spindle assembly; Fig. 9 is an enlarged cross-section through the jack member supporting the spindle assembly; Figs. 10 and 11 show enlarged front and side elevations, respectively, of the movable spindle assembly supporting carriage; Fig. 12 shows an enlarged cross-section of the glass cooling means; Fig. 13 shows an enlarged plan view of a portion of the rouge feed valve; Fig. 14 shows one form of the glass driving rolls; and Fig. 15 shows an enlarged cross-section through the guard for the water cooling means.

Referring now in detail to the drawings, reference character 1 indicates a polishing bridge, a plurality of which are spaced longitudinally of the path of travel of the glass 2. Disposed on opposite sides of each polishing bridge are glass cooling members 3, and between each pair of polishing bridges and their associated cooling members are glass driving rolls 4. The number of polishing bridges 1 employed in the polishing apparatus will vary depending upon such factors as speed of the glass moving through the apparatus, the pressure applied by the polishing felts, and the condition of the glass surfaces when first entering the polishing apparatus. Where a continuous ribbon of glass is operated upon, the speed of the glass moving through the apparatus is dependent upon the capacity of the tank to provide the glass ribbon.

Each polishing bridge 1 comprises a suitable movable carriage, such as 5, and a fixed rear stand 6 providing support for upper and lower spindle supporting members 7 and 8 respectively. Each polishing bridge carriage 5 includes a pair of spaced bottom members 9 disposed transversely of the line of travel of the glass ribbon, wheeled axle members, such as 10, journalled in suitable bearings, and suitable wheel members 11 engaging rails 12 for movement of the carriage transversely of the line of travel of the glass ribbon 2. The opposite ends of the members 9 are provided with suitable means, such as the clamp members 13, for selectively anchoring the carriage on the track 12 in fixed relation to the glass ribbon. At the outer side of the carriage 5 are suitable uprights, such as 14, for receiving and supporting the top and bottom spindle supporting members 7 and 8. Each of the members 7 and 8 are supported at one end upon the carriage 5 by means of roller members 15 journalled on the members 14 and provided with spaced flanges 16 between which the members 7 and 8 are guided for straight line movement relative to the carriage member 5, as will be hereinafter described. Any suitable means, such as 17, may be provided for maintaining the carriage members 14 in rigid assembly with the carriage bottom members, and the carriage bottom members may be held in assembled relation by such suitable means as the plate 18.

The polishing bridge rear stand 6 includes a fixed base 19 upon which are mounted suitable spaced upright members 20 for reception of one end of the top and bottom members 7 and 8. These members 20 are provided with spaced pairs of rollers 15, as in the carriage member 5, for support and guidance of the top and bottom members 7 and 8. The rollers 15 are journalled in the uprights 20 by suitable means, such as the bearings 21.

The polishing bridge spindle assembly supporting members are two in number and are disposed on opposite sides of the glass ribbon moving through the polishing bridge. The upper supporting member 7 has mounted thereon the several spindle assemblies disposed transversely of the glass ribbon and carries the spindles, their driving mechanisms, and the rouge feed valves. The member 7 is necessarily of sufficient rigidity to carry the imposed load without harmful deflection. The lower supporting member 8 is substantially a duplicate of the member 7 but disposed beneath the glass ribbon. This member 8 with its associated spindle assemblies may be considered as being a member 7 rotated 180° about a longitudinal axis of that member.

Each spindle supporting member 7 and 8 may be of any suitable construction and, for purposes of illustration, are shown as being of box section. The top and bottom walls 22 and 23 thereof have a plurality of longitudinally disposed, centrally located, opposing spindle housing apertures 24 therein. Within each member 7 and 8 are apertured thimble members 25 connecting the walls 22 and 23, the apertures of thimbles 25 coinciding with the apertures 24. The top and bottom walls 22 and 23 engage the rollers 15 of the polishing bridge carriage 5 and rear stand 6 to support the spindle assemblies in adjustable position on opposite sides of the glass ribbon 2.

Each spindle assembly includes a housing member 26, a hollow spindle 27 mounted within the housing member 26, and a spindle hub 28 mounted on the lower end of the spindle 27. This assembly extends through each supporting member 7 and 8 and is adjustably connected therewith by a suitable means to be hereinafter described. The number of spindle assemblies on each polishing bridge is governed by the width of the glass sheet 2 and the size of the polishing runners. For purposes of illustration in Figs. 2 and 3 of the drawings, the number of spindle assemblies above and below the glass for each polishing bridge is shown as four. This number may be increased or decreased as design requirements dictate.

Each housing member 26 is mounted for a sliding fit within the thimble 25 of member 7 or 8 and has a longitudinally extending opening throughout its length for reception of spindle 27. One end of each housing 26 is provided with an enlarged hollow portion 29 closed by a hollow cap member 30, and within the enclosure so formed are the worm gear 31 and worm 32 for driving the spindle 27. The housing portion 29 and cap 30 are provided with suitable matching apertures within which the ends of the worm 32 are journalled. The top wall of each cap 30 has a suitable aperture through which one end of the spindle 27 projects. The spindle 27 rotates relative to housing 26 and, for this purpose, antifriction bearings 33 are provided adjacent the ends of the longitudinal spindle aperture in housing 26. One end of each housing 26 projects beyond the wall 23 of the member 7 and is closed by a detachable plate 34 permitting assembly of the adjacent anti-friction bearing 33. Each plate 34 has an aperture therein through which spindle 27 extends for attachment to the adjacent polishing runner.

Each hollow spindle 27 is individually driven and for this purpose has bearings 33 mounted thereon intermediate the ends of the spindle. The worm gear 31 is fastened adjacent one end of the spindle by lock nuts 35, and a hub 28 and polishing runner is mounted on the opposite end of the spindle. The weight of the spindle and its associated mechanisms is supported upon the spindle housing 26 through the worm gear 31 and adjacent bearing 33. The spindle hub 28 is rigidly secured to the spindle 27 and forms a means for attachment of the polishing runner, to be hereinafter described. As best illustrated in Fig. 6 of the drawings, the hub 28 also provides a means for feeding air and vacuum to the polishing runner through the passageways 36 and 37. The vertical passageways 36 are in communication with an annular passageway 38. Mounted on the hub 28 is a sleeve member 39 permitting rotation of the spindle and hub relative to the sleeve 39. The sleeve 39 is connected to air and vacuum supply lines 40 and 41, respectively. The passageways 42 and 43 in sleeve 39 connect these supply lines with the annular passageway 38 of hub 28. A suitable plate 44 holds sleeve 39 in place upon hub 28.

Mounted upon each spindle 27, as best shown by Figs. 6 and 7, is a polishing runner which rotates with the spindle. Each polishing runner includes a runner plate 45, a polishing felt 46, and flexible diaphragms 47 and 48 connecting the felt to the runner plate. Runner plate 45 is provided with a substantially L-shaped peripheral flange 49 and an intermediate annular flange 50. An aperture in the center of runner plate 45 receives the end of spindle hub 28, and suitable fastening means, such as screws 51, connect the runner plate with the hub 28. At least two preferably diametrically opposite apertures 52 are formed in each runner plate 45 and are connected with spindle hub 28 by the conduits 53. Attached to the flange 50 of each runner plate 45, by means of a clamping ring 54, is a circular inner flexible diaphragm 47. This diaphragm has a central aperture, substantially equal to the inner diameter of flange 50, for admitting rouge to the felt 46. A larger outer circular diaphragm 48 is attached to each runner plate flange 49 by means of a clamping ring 55.

Each felt runner 46 is formed of any suitable felt-like material which will absorb the rouge mixture fed thereto in a manner hereinafter described. This felt runner is preferably circular and is provided with a large central opening 56, of a diameter less than the outer diameter of the diaphragm 47, for reception of the rouge mixture. Suitable channels 57 are formed in the glass engaging face of each felt runner and extend from the opening 56 therein to the periphery thereof. These channels 57 are connected intermediate their ends by a plurality of cross channels 58 as shown in Fig. 6. These channels 57 and 58 thus feed rouge across the entire face of the felt runner 46. These channels 57 and 58 also increase the flexibility of the felt runner. For purposes of attaching the felt runner 46 to diaphragms 47 and 48, a flexible metal backing plate 59 is provided for the felt. The felt is preferably cemented to plate 59 and the plate clamped to the diaphragms 47 and 48 by clamping rings 60 and 61 respectively. The backing plate 59 permits flexing of the felt 46 for a purpose to be hereinafter described. As shown in Fig. 6, the runner plate flange 49 and clamping ring 54 space the felt runner 46 from the under side of runner plate 45 to provide an annular space into which air under pressure is admitted from conduits 53 to press the felt runner 46 against the glass 2. In order to obtain uniform pressure over substantially all the area of felt 46, the runner plate flange 49 has channels 62 therein permitting passage of air pressure to the portions of the felt backing plate 59 beneath diaphragm 48.

Manual vertical adjustment of the spindle and polishing runner assembly is best illustrated by Figs. 4, 5, 8, and 9. Automatic adjustment of pressure of the polishing felts upon the glass and compensation for felt wear are provided by the polishing runner diaphragm and felt construction just described. Referring now to Fig. 5 of the drawings, the spindle 27 is driven by the worm wheel 31 and worm 32 mounted within the spindle housing end portion 29 and spindle housing cap 30. This cap 30 is suitably connected with the housing portion 29 and has a top surface 85 upon which is mounted the motor 86. The motor shaft 87 is provided with a suitable gear 88 connected by the usual driving means to a gear 89 mounted upon the end of worm 32. This drive mechanism is enclosed by any suitable guard mechanism 90.

Referring now to Figs. 4, 8, and 9 of the drawings as best showing the manual adjustment for the spindles, the weight of each motor and spindle housing is adjustably carried upon the associated member 7 or 8 by means of the jack member 91. This jack member comprises a hollow sleeve 92 having right and left hand internal threads. Mounted in opposite ends of sleeve 92 are right and left hand screw members 93 and 94. Each screw member terminates in a base 95 which is attached by suitable machine screws to the adjacent housing cap 30 and supporting member 7 or 8. For purposes of rotating sleeve 92, a suitable gear 96 is mounted thereon. Obviously, when sleeve 92 is rotated in one direction, the screw members move outwardly of the sleeve, withdrawing the spindle and motor assembly away from member 7. Conversely, when the sleeve 92 is rotated in the opposite direction, the screw members 93 and 94 move inwardly of the sleeve 92, permitting the motor and spindle to move towards the member 7.

For purposes of convenience in operating jack 91, an adjusting mechanism is mounted adjacent the ends of members 7 and 8, as shown in Figs. 4 and 8. Referring now to Fig. 8, an L-shaped bracket 97 is mounted adjacent one side of the member 7. Upon one end of the bracket are suitably mounted gears 98 and 99. Adjacent the opposite end of the bracket and on the same side thereof as gears 98 and 99 is a gear 100. This latter gear is suitably mounted upon a shaft 101 which is journalled in the bracket 97 and extends beyond the opposite side thereof towards the center of the associated polishing bridge 1. Shaft 101 terminates in a hand wheel 102. Trained over the jack gear 96 and bracket gears 98, 99, and 100 is a chain or other suitable means for driving these gears upon rotation of the hand wheel 102. Obviously, the gear train ratio can be so arranged, by well understood procedures, to obtain relatively fine adjustments of the vertical positioning of the spindle and polishing runner assembly.

Similarly, by use of the same gear arrangement and brackets 103 and 104 mounted on the opposite side of the supporting member 7, the second spindle and polishing runner assembly measured inwardly from the end of the member 7 may be vertically adjusted. The two remaining spindle and polishing runner assemblies at the opposite end of member 7 may be adjusted by brackets and assembled gears similar to those of brackets 97, 103, and 104. The foregoing arrangement makes for convenient adjustments from the ends of member 7 and avoids the necessity for an operator to move between the polishing bridges 1.

As best illustrated in Fig. 7, a rouge feed valve assembly is suspended within each hollow spindle 27 by means of bracket 63 mounted on the adjacent spindle housing cap 30. This valve assembly comprises a water-tight housing 64, a rouge feed tube 65, needle valve 66, and valve stem 67. The valve assembly does not rotate with the spindle 27 and, for this purpose, acts as an independent assembly having no contact with the spindle except as the housing 64 closes the end of the hollow spindle 27. To permit rotation of the spindle 27 relative to the valve housing 64, a sleeve bearing 68 is mounted in the spindle for contact with the valve housing, and the latter is held against movement by the bracket clamping ring 63a.

The feed valve assembly comprises the housing tube 64 closed at its upper end by an internally threaded apertured plug 69 and closed at the opposite end by a nozzle member 70 threaded into the tube 64. Adjacent the nozzle member 70 is a spacer member 71 mounted in tube 64 and provided with a central aperture to receive the rouge feed tube 65. This member 71 is also provided with spaced apertures 71a to permit free passage of the rouge mixture on opposite sides of the rouge feed tube 65 for a purpose hereinafter set forth. The nozzle member 70 has a central aperture 70a through which the needle valve 66 protrudes. The upper portion of the aperture is enlarged to receive rouge mixture from the feed tube 64, and the lower end of the aperture is constricted so as to be selectively engaged by the needle valve 66 in controlling feed of rouge mixture to the polishing felts 46. Depending from nozzle member 70 is a portion 72 having an aperture therein communicating with the aperture in member 70. The needle valve has an end portion projecting into the aperture of portion 72 to prevent clogging by rouge separating from the rouge mixture flowing through portion 72. A suitable deflector member 73 or feed member 74 is threaded onto the portion 72 of nozzle member 70. The feed member 74 is mounted on the feed valve assembly disposed beneath the glass 2.

The moving portion of the rouge feed valve assembly comprises the feed tube 65, needle valve 66, and valve rod 67, which are connected to move as a unit. The valve rod 67 is suspended from the bracket arm 63e by means of a solenoid 75 which is preferably pivotally connected to the bracket arm 63e and the valve stem head 76. The valve stem 67 is guided by passing through apertures in the fixed bracket arms 63c and 63d. Vertical movement of the valve rod is controlled by stop members adjustably mounted on the valve rod between the bracket arms 63c and 63d. These stop members may be of any construction, one form being the spaced lock nuts 77 and 78 mounted on a threaded portion of rod 67. A compression spring 79 surrounding rod 67 and engaged between bracket arm 63c and the valve rod end 80 serves to positively return the needle valve 66 to its seat in nozzle member 70. Valve rod end 80 is provided with a threaded portion for connecting same to the adjacent end of feed tube 65. Suitable connecting passageways 81 and 82, in valve rod end 80, communicate with the interior of the feed tube 65. Passageway 82 has suitable means for connecting rouge mixture inlet conduit 83 therewith. A similar means on housing member 64 provides for connection of rouge mixture outlet conduit 84. The needle valve 66 which closes the end of tube 65 has a central passageway therein for a portion of its length and terminating in apertures 85 communicating with the aperture 70a in nozzle member 70.

Referring now to Figs. 12 and 15 of the drawings, one form of a glass cooling unit, as indicated generally by the reference character 3, is disposed both above and below the glass sheet 2. Each cooling unit 3 comprises side members 105, a top member 106, and end members 107, all connected to form the cooling unit body. Each side member 105 is preferably of inverted L-shape, providing an off-set at each side of the cooling unit within which are mounted spaced squeegee members 108 separated by spacer members 109 and secured in place by suitable means such as machine screw 110. The squeegee members 108 extend beyond the side members 105 for engagement with the glass ribbon 2. Intermediate the ends of side members 105 are spaced pipe supporting members 111. The members 107 and 111 are provided with aligned apertures to receive water pipes 112. The pipes 112 extend into the cooling unit 3 for approximately one-half the length thereof, and have their inner ends closed. Each pipe has a plurality of small apertures 113 therein through which the water, constantly flowing into the pipes, sprays against the glass sheet 2. If desired, the apertures 113 may be of different sizes with the larger ones adjacent the center of the cooling unit. Obviously, the water in the top units 3 may be supplied in an amount sufficient to form a solid volume resting upon the glass and flowing out of the cooling unit beneath end member 107 and between the innermost squeegee members 108. In the lower unit 3 of each pair, the apertures 113 in pipes 112 may be increased to approximate this result. The squeegee members 108 in each case prevent water flowing longitudinally of the glass sheet 2 and diluting the rouge mixture beneath adjacent polishing felts 46. Water for pipes 112 is supplied through suitable flexible conduits 113. To maintain the squeegee members 108 under sufficient pressure to retain the cooling water within each unit 3, suitable compression springs 114 are mounted upon the bolts 115 passing through the end members 107 and engaging suitable cooling unit supporting stands 116.

The cooling unit just described may be of any desired form and may use other cooling mediums to extract the heat from the glass. Water is usually readily available and cheapest for this purpose. A fluid such as water may be readily controlled as to temperature so as to avoid thermal shock as the glass passes past the unit and yet provide the desired cooling effect. The degree of cooling applied to the glass is preferably such as will quickly and effectively remove from the glass such heat as was generated therein while passing between the preceding opposed polishing felts. Obviously, the amount and temperature of the cooling medium will vary with different thicknesses of glass being worked upon. An additional advantage resulting from use of water as a cooling medium is the cleaning effect of the water sprays applied to the glass. The water flushes substantially all the rouge from the surfaces of the glass and the squeegee members wipe the glass substantially dry and clean.

As shown in Fig. 15, the cooling units 3 are longer than the glass sheet 2 is wide, so that the water flows over the sides of the sheet 2 between squeegee members 108. To collect the water so flowing, a trough member 117 may be mounted beneath each unit 3 to receive the water and discharge it into drain pipe 118 by means of conduits 119. Preferably, an apron member 120 extends longitudinally of each polishing bridge 1 to deflect the water into the trough member 117. When the apron 120 is used, collar members 121 surround each spindle housing 27 to deflect water therefrom. Each apron 120 preferably has an upwardly deflected end portion 121 to further confine the water. Shields 122 may also be provided to deflect water from the adjacent driving rolls 4.

Drive rolls 4, as shown in Figs. 4 and 14, may be of any suitable construction and may comprise a metal core 123 having an outer rubber covering 125. These rolls 4 are preferably longer than the width of the glass sheet 2 so as to overlap the sides of the sheet 2. The roll coverings 125 preferably are relatively soft and provided, at least at the area engaging the glass, with apertures 125a therein to grip the glass. By suitable means, the rolls may be adjusted so that the portions engaging the glass are deflected so that the ends of the covering 125 form guide flanges for the glass, as shown in Fig. 14. Suitable bearings 127 are provided for opposite ends of the rolls 4, and these bearings are preferably adjustably mounted on suitable stands 128. Suitable driving means are provided for the driving rolls so that the glass has a constant speed through the polishing bridges.

As illustrated in Figs. 10 and 11 of the drawings, one form of means has been provided for limited reciprocation of the spindle assembly supporting members 7 and 8 upon the carriage members 5 and rear stand 6. By means of this reciprocation, the rotating felts 46 may be given a limited movement transversely of the moving glass sheet 2, thereby avoiding pattern marks upon the glass from the felts. Mounted within an end of each of the members 7 and 8, supported upon the carriage member 5, are the motors 132. These motors are of a slow speed, high torque type, and suitable results have been obtained by using a motor having 9 R. P. M. Keyed to each motor shaft is a crank member 129 to which is pivotally attached a connecting rod 130, the opposite end of the connecting rod being pivotally connected with the bracket pivot 131 rigidly mounted on the upright 14 of the carriage 5. It will be obvious that as the motor shaft rotates the crank 129, the members 7 and 8 will be reciprocated transversely of the glass sheet a distance equal to the throw of the crank member 129. Excellent results have been obtained when the members 7 and 8 are reciprocated 1" or more in each direction from normal position. It will be obvious that any portion of the polishing felt moved beyond the edge of the glass will tend to have the rouge mixture thereon scraped off by the edge of the glass, and it would therefore appear advisable to limit the reciprocating motion to a minimum which will accomplish the desired purpose. In addition to the avoidance of pattern marks upon the glass from the polishing felts, reciprocation of the felts has also been observed to tend to speed up the polishing action. The mechanism described provides for independent reciprocation of the members 7 and 8. This type of reciprocation has been found to give good results. However, in view of the glass sheet being in effect supported on the polishing felts which are pressed against the glass under relatively high pressures, the best results are obtained by maintaining the upper and lower felts in opposing relationship, and to obtain this it is desirable to reciprocate the upper and lower bridge members 7 and 8 of each polishing bridge 1 in unison. This substantially unitary movement of the members 7 and 8 of each polishing bridge may be obtained by synchronization of the motors, or the simplest expedient being to connect the members 7 and 8 together and to drive them with one motor. This method has been found to give excellent results.

As hereinbefore stated, the polishing apparatus as described is adapted for operation upon a continuous ribbon of glass or a substantially continuous ribbon of glass comprised of separate sheets of any desired length disposed in substantially end to end relation and passed through the apparatus.

The polishing action upon the glass while passing through the above described apparatus is obtained by floating the glass within each polishing bridge upon pairs of opposing rotating felts exerting equal and opposite pressure upon the glass, independently of the mass of their respective driving spindle assemblies, while selectively feeding rouge to the felts to control the amount of heat generated within the glass between each pair of opposing felts, and removing substantially all such heat from the glass before it enters the next polishing bridge.

When preparing the apparatus for operation or in changing from one glass thickness to another, the rotating spindles are preferably stopped and the entire apparatus cleared of glass. To remove the glass, fluid pressure should be released from the polishing runner flexible diaphragms of both members 7 and 8 of each polishing bridge. Preferably, vacuum should be applied to conduits 41 of each polishing runner of at least the members 7 so as to uniformly retract the flexible diaphragms 47 and 48. Usually, the weight of the felts supported upon the members 8 will be sufficient to retract their associated flexible diaphragms without the use of vacuum. The entire apparatus should then be aligned in order to obtain movement of the glass through the apparatus in the manner desired.

Various methods may be used in aligning the several bridges 1 comprising the polishing apparatus. The first step should be to place the opposing spindles 27 of each bridge in substantially vertical alignment and the members 7 and 8 of the same bridge in horizontal alignment. To retain the glass in substantially a single horizontal plane while passing through the apparatus, the bottom roll of each pair of driving rolls 4 should be placed in horizontal alignment and the top roll of each pair brought into engagement with the aligned bottom roll. The rolls 4 of the apparatus should now be actuated and the glass sheet passed through the entire apparatus.

After the glass is passing through the apparatus, the cooling units 3 may then be similarly aligned by individually adjusting each unit 3, after water is passing therethrough, so that the squeegee members 108 wipe the glass substantially dry on both sides of the sheet. The rouge should then be circulated through each rouge feed valve before adjusting the driving spindles and polishing runners.

To adjust the polishing runners it is preferable to suitably manipulate the hand wheels 102, with the spindles rotating, so as to bring each polishing felt barely into contact with the glass. The direction of rotation of the polishing felts should be checked, if the apparatus has not been previously used, to insure that the opposing felts on opposite sides of the glass are rotating in opposite directions and each polishing felt is rotating in a direction opposite to each adjacent felt transversely of each polishing bridge. The purpose of this manner of rotation is to minimize the drag of the felts upon the glass longitudinally of the line of travel thereof and the tendency for transverse displacement of the glass relative to a straight line of travel. Fluid pressure in the desired amount may now be admitted to each inlet conduit 40 of each spindle so that each felt exerts equal pressure upon the glass. The apparatus is now ready to begin the polishing action.

The glass now entering each polishing bridge presents a clean surface to each pair of opposing polishing felts. Each polishing felt throughout its entire area in contact with the glass exerts the same pressure upon the glass. Should there be any unevenness in the surface of the glass, the felt and its thin backing plate will flex sufficiently to retain the entire area of the felt substantially in contact with the glass to provide a substantially uniform polishing action. This flexing of the felt is substantially aided by reason of the sole connection between the felt 46 and the runner plate 45 being provided by the flexible diaphragms 47 and 48. The frictional resistance between each felt 46 and the glass generates heat which passes into the glass, causing expansion thereof. By reason of the substantially uniform pressure of the felts for their entire area engaging the glass, substantially uniform heating of the glass is obtained.

In order to control the amount of heat generated beneath each felt 46, the rouge feed valves are individually and automatically actuated to feed rouge to each felt whenever the frictional resistance between any felt and the glass reaches a pre-selected maximum. It is a well known fact that the drier the felt, the greater the frictional resistance between the felt and the glass for any given pressure. Likewise, the greater the frictional resistance between the felt and the glass, the greater the power required to keep the felt rotating at a constant speed. By feeding rouge to the felts only as the frictional resistance exceeds a certain pre-selected amount, the heat input from any felt can be closely controlled. Also, by feeding rouge intermittently and only as required, substantially uniform polishing action is obtained at each felt.

As best shown in Fig. 7, rouge mixture is constantly flowing through each rouge feed valve but is admitted to the felts only when the valve is raised by action of the solenoid 75. When the feed valve is in the position shown in Fig. 7, rouge entering the valve through inlet conduit 83 passes down valve tube 65 into nozzle 70 and upwardly through member 71 and valve housing 64 to outlet conduit 84, from which it flows back to a central supply source (not shown). When, however, the polishing felts dry out and frictional resistance builds up between the felt and glass, the increased power requirements of the motor are registered on a watt meter diagrammatically shown at the upper right hand corner of Fig. 7. This watt meter is in circuit with a relay 130 which closes and actuates solenoid 75. When the solenoid is actuated, it raises valve stem 76 until stop 77 engages bracket arm 63d and holds it there until relay 130 opens, cutting off current to the solenoid and permitting compression spring 78 to again close the valve. During the time valve stem 76 is in raised position, valve needle 66 is raised from the opening in the aperture in member 70, permitting rouge to flow through 72 onto glass 2. The rouge then enters channels 56 and 57 of the felts to moisten the felts and reduce the frictional resistance between the felt and the glass. Separate watt meters are in circuit with each motor 86 so as to automatically control the maximum heat input into the glass under any felt.

As the glass 2 moves out from under the felts 46 of the first bridge 1, it passes through the cooling unit 3 which washes the glass and dries it before passing between rolls 4. Upon leaving driving rolls 4, the glass then passes through a second cooling unit 3 before entering the second bridge 1, where the polishing action is repeated in the manner previously described. Enough polishing bridges 1 are provided to effect the degree of polishing desired. Obviously, as illustrated, where a plurality of pairs of rotating opposed felts are disposed transversely of the glass, the same polishing action, rouge feed, and heat control occurs at each pair of felts. Tests have shown that with apparatus of the type illustrated, a temperature differential of less than 5° F. can be maintained transversely of the glass sheet.

By reason of differences in felt composition, the several felts of any one polishing bridge 1 will show different rates of wear even though all felts were renewed at the same time. Therefore, it has been found advisable for an operator to examine the felts from time to time and make such adjustments as are necessary to correct for excessive wear by suitable manipulation of the respective hand wheels 102. It will also be understood that the several bridges 1 have their respective members 7 and 8 slowly reciprocating transversely of the glass, and this tends to cause excessive wear of the two outer pairs of felts which move beyond the edge of the glass, necessitating more frequent adjustment. Adjustments will also be found necessary, from time to time, to compensate for wear on the rolls 4 and cooling unit squeegee members 108.

Where repairs are required and the extent thereof necessitates shutting down any polishing bridge for extended periods, spare members 7 and 8 are usually on hand and are used to replace such members in the polishing bridge. To replace either or both members 7 and 8 of a polishing bridge, the motors 86 thereof are stopped, air cut off from the felts 46, and rail clamp 13 released at the carriage member 5. A suitable sling is placed around members 7 and 8 and these with carriage member 5 are moved free of the glass upon rails 12 which extend transversely of the glass for this purpose. The members 7 or 8 may then be removed from carriage 5. The whole is then moved inwardly again to embrace the glass until the members 7 and 8 are again supported on rear stand 6. The spindles are again adjusted, suitable air, water, and rouge connections made, and the bridge is returned to operation.

Throughout the description, reference has been made chiefly to polishing of glass. It is to be understood, however, that grinding and polishing are similar operations and anyone skilled in the art might readily adapt many of the operations described to grinding of glass. Therefore, throughout the description and annexed claims, the term "polishing" is intended to include both grinding and polishing insofar as the apparatus described and claimed is adaptable to both operations.

While only a specific embodiment of the apparatus is disclosed in the specification, many modifications therein will suggest themselves to those skilled in the art, and we do not wish to be limited to the specific disclosure except as is made necessary by the scope of the appended claims.

What is claimed:

1. In apparatus for simultaneously polishing both faces of a moving horizontal glass sheet, the combination of, a plurality of pairs of opposing axially aligned rotating runners spaced longitudinally of the sheet, independently supported rotating means for each runner, a felt facing member associated with each runner, fluid pressure means acting on each runner member for imposing equal pressures upon the adjacent face of the glass, independent rouge feed mechanisms associated with each felt facing member, and control means associated with each feed mechanism and the actuating means for the associated runner facing member to feed rouge to the glass beneath the felt as its frictional resistance upon the glass varies between a preselected maximum and minimum.

2. In apparatus for simultaneously polishing opposite faces of a moving horizontal glass sheet, the combination of, a pair of opposing axially aligned polishing runners between which the glass is moved, a hollow driving spindle for each polishing runner, an electrically driven motor for actuating each driving spindle, means for independently and adjustably supporting each polishing runner and actuating motor, a polishing felt mounted on each runner, a solenoid actuated rouge feeding valve means extending within each hollow spindle, means supporting each rouge feeding valve independently of the adjacent spindle, and means for controlling the pressure of each polishing felt upon the glass.

3. In apparatus for simultaneously polishing opposite faces of a moving horizontal glass sheet, the combination of, a pair of opposing axially aligned polishing runners between which the glass is moved, a hollow driving spindle for each polishing runner, an electrically driven motor for actuating each driving spindle, means for independently and adjustably supporting each polishing runner and actuating motor, a polishing felt flexibly mounted on each runner, a solenoid actuated rouge feeding valve means disposed within each hollow spindle, means supporting the rouge feeding valve independently of the spindle, means for controlling pressure of each polishing felt upon the glass, and an electrical circuit, including the motor and rouge feed valve solenoid, for opening the feed valve when the frictional resistance between the felt and the glass increases to a predetermined maximum and permitting the feed valve to close after rouge is fed to the glass surface.

4. Apparatus as in claim 3 in which the polishing felt has a central aperture connected with the periphery of the felt by radially extending channels cut in the face of the felt, and the feed valve deposits the rouge within the felt's central aperture for distribution over the adjacent face of the glass through the radial channels in the face of the felt.

5. Apparatus as in claim 3 in which the rouge feed valve comprises a nozzle portion closing the hollow housing portion and adjacent end of the hollow spindle, a central aperture in the nozzle member communicating with the housing portion and terminating in a constricted portion adjacent the polishing felt, a hollow valve stem within the valve housing and terminating in a needle valve normally closing the constricted portion of the nozzle aperture, apertures in the valve stem communicating with the nozzle central aperture, a rouge inlet aperture in the upper end of the valve stem and a rouge outlet in the valve housing providing for continuous circulation of the rouge through the valve stem and valve housing independently of the position of the needle valve.

6. In an apparatus for simultaneously polishing opposite faces of a glass sheet moving through the apparatus, the combination of, a polishing bridge comprising a rear stand, a front carriage, spaced upper and lower spindle assembly supporting members disposed transversely of the moving glass sheet for connecting the rear stand and front carriage, spaced roller members journalled on the carriage and rear stand for providing bearing supports for the upper and lower spindle supporting members, spindle assemblies mounted in the upper and lower supporting members at opposite sides of the glass sheet forming axially aligned opposing pairs spaced transversely of the glass sheet, polishing runners included in each spindle assembly for engagement with adjacent faces of the glass sheet, independent driving means for each spindle assembly imparting rotary motion thereto in a direction counterclockwise to the opposing and to the adjacent spindle assemblies.

7. Apparatus as in claim 6 in which actuating means are provided, connecting the carriage and spindle supporting members, for imparting to the spindle supporting members limited reciprocal movement transversely of the glass sheet.

8. In an apparatus for simultaneously polishing the opposite faces of a glass sheet moving through the apparatus, the combination of, a plurality of transversely disposed polishing bridges spaced longitudinally of the moving glass sheet, each bridge including opposing polishing members operating on the glass throughout its transverse area, a housing member between each adjacent bridge at opposite faces of the glass and extending across the glass for its entire width, an opening in each housing, an apertured conduit in each housing for spraying water through the housing opening onto the glass throughout the full width thereof, and squeegee means at each side of the housing opening for engagement with the adjacent face of the glass to confine the water between the squeegee means and to cause the water to escape over the sides of the glass sheet.

9. Apparatus as in claim 8 in which the housing members are provided with means for vertically adjusting the housing relative to the glass.

10. In an apparatus for simultaneously polishing the opposite faces of a continuous glass sheet moving through the apparatus, the combination of, a plurality of transversely disposed polishing bridges spaced longitudinally of the glass sheet, means on each polishing bridge for imparting a polishing action on each side of the glass while moving through the bridge, driving rolls between the adjacent bridges and extending transversely of the glass beyond each side thereof, each driving roll having a relatively soft flexible compressible peripheral covering for engagement with the glass and a relatively hard peripheral portion of less compressibility disposed beyond the edge of the glass, and means for moving said rolls into engagement with the glass with sufficient force to compress the glass engaging portion sufficiently to bring the end portions in overlapping vertical relation with the glass to form guide flanges therefor.

11. The method of polishing a substantially continuous horizontal glass sheet moving through a series of spaced polishing mechanisms along a predetermined path comprising the steps of, applying equal fluid pressures to opposed rotating polishing runners engaging opposite faces of the glass passing through each mechanism, regulating the rate of temperature increase in the glass surface between the opposed runners by controlling the maximum frictional resistance between the glass surface and adjacent polishing runners of each mechanism, and cooling the surfaces of the glass sheet to a preselected maximum temperature during passage between the spaced polishing mechanisms.

12. The method of simultaneously polishing opposite faces of a moving substantially continuous horizontal glass sheet comprising the steps of, applying to the glass opposed polishing means under equal fluid pressures at spaced intervals along its path of travel, uniformly restricting the maximum frictional resistance between the surface of the glass sheet and the polishing means, and maintaining a substantially uniform surface temperature in the glass as it enters between the several spaced polishing means.

13. The method of simultaneously polishing opposite surfaces of a moving horizontal glass sheet comprising the steps of, applying a polishing action to opposite surfaces of the glass at spaced intervals along its path of travel, maintaining the sheet in a substantially uniform horizontal plane during each application of the polishing action by equal and opposite fluid pressures applied to the glass during the polishing action, automatically controlling the maximum rate of heat input upon the surface of the glass at each application of the polishing action, and cooling the glass sheet between each application of the polishing action so as to restrict breakage due to thermal forces building up from successive applications of the polishing action.

14. The method of simultaneously polishing opposite faces of a moving substantially continuous horizontal glass sheet comprising the steps of, simultaneously applying a plurality of fixed rotating opposing polishing actions transversely of the sheet at spaced intervals along the longitudinal length of the sheet, applying equal fluid pressure to the polishing actions transversely of the sheet and at opposite faces of the sheet, controlling the maximum rate of heat input at the transverse surface of the sheet from frictional resistance beneath each opposing polishing action through individual selective feeding of rouge to the sheet at the area of application of the polishing action, and selectively cooling opposite faces of the sheet between the transverse applications of polishing action so as to inhibit temperature build up in the sheet during passage through the longitudinally spaced applications of polishing action.

15. The method of polishing a substantially continuous glass sheet moving horizontally through a series of spaced polishing mechanisms comprising the steps of, applying equal pressures to opposite faces of the glass by opposed polishing runners at each polishing mechanism, controlling the maximum frictional resistance between each face of the glass and the opposed polishing runners to limit the rate of temperature increase in the glass during passage through a polishing mechanism, and cooling both surfaces of the glass below a preselected maximum temperature during passage between the mechanisms.

16. In an apparatus for simultaneously polishing opposite faces of a moving horizontal glass sheet, in combination, oppositely disposed and independent vertically adjustable rotating hollow spindle members, a hollow sleeve member disposed within each spindle member for closing the opening therein at the opposing ends of the spindle members, a glass polishing felt mounted on the opposing ends of each of the spindle members, an aperture in each polishing felt at the center thereof, annular depressions in the face of each felt and radial depressions in the face of each felt connecting the central aperture with the annular depressions, an opening in each spindle sleeve member communicating with the adjacent polishing felt center aperture, a hollow valve member within the spindle sleeve and in peripheral spaced relation to the sleeve member, a solid end portion on the valve member being normally seated in the opening of the sleeve member adjacent the polishing felt center aperture, a rouge solution inlet to the hollow valve member, a rouge solution outlet in the hollow valve member above the solid end portion thereof and in communication with the hollow spindle sleeve member, a rouge solution outlet on the hollow spindle sleeve member, means for continuously circulating rouge solution through the valve member inlet and spindle sleeve outlet, means associated with the spindle rotating mechanism and valve member for raising the valve member to feed rouge solution to the glass at the felt center aperture when the frictional resistance between the felt and the glass reaches a predetermined maximum.

17. Apparatus for simultaneously polishing opposite faces of a glass sheet moving in a horizontal plane through the apparatus, including a pair of independently driven vertically disposed and independently adjustable opposing rotatable spindle members, felt faced polishing runners on the opposing ends of the spindle members for engaging opposite faces of the glass, mechanisms associated with each spindle runner for feeding rouge to the felt facing and glass, and means associated with each spindle drive for intermittently actuating the rouge feed mechanism when the frictional resistance between each felt and the glass reaches a preselected maximum.

18. In an apparatus for simultaneously polishing opposite faces of a glass sheet, in combination, oppositely disposed and independently adjustable rotating spindle members, polishing runner members mounted on each spindle member for rotation therewith, a flexible diaphragm member mounted on each runner member, a polishing felt connected with each runner member through the flexible diaphragm, and means associated with each runner member for selectively admitting into and withdrawing fluid pressure from the space between each runner member and the felt for maintaining a uniform pressure between the faces of the opposing felts and the interposed glass sheets.

EUGENE HOYET.
FRANK F. PAINTER.

References Cited in the file of this patent

UNITED STATES PATENTS

| Number | Name | Date |
| --- | --- | --- |
| 1,474,672 | Heuze | Nov. 20, 1923 |
| 1,620,021 | Hitchcock | Mar. 8, 1927 |
| 1,729,498 | Waldron | Sept. 24, 1929 |
| 1,800,743 | Morris | Apr. 14, 1931 |
| 1,803,752 | Ford | May 5, 1931 |
| 1,955,128 | Henderson | Apr. 17, 1934 |
| 2,131,862 | Waldron | Oct. 4, 1938 |
| 2,264,177 | Harrington | Nov. 25, 1941 |

FOREIGN PATENTS

| Number | Country | Date |
| --- | --- | --- |
| 221,029 | Great Britain | Sept. 4, 1924 |
| 419,747 | Great Britain | Nov. 19, 1934 |